Aug. 29, 1967  K. GREBE  3,338,380
CONVEYOR BAND WITH CARRIERS
Filed Sept. 10, 1965  5 Sheets-Sheet 1

INVENTOR
KONRAD GREBE
BY
Burgess, Dinklage & Sprung
ATTORNEYS.

Aug. 29, 1967 — K. GREBE — 3,338,380
CONVEYOR BAND WITH CARRIERS
Filed Sept. 10, 1965 — 5 Sheets-Sheet 2

INVENTOR
KONRAD GREBE
BY Burgess, Dinklage & Sprung
ATTORNEYS.

Aug. 29, 1967   K. GREBE   3,338,380
CONVEYOR BAND WITH CARRIERS
Filed Sept. 10, 1965   5 Sheets-Sheet 3

INVENTOR
KONRAD GREBE
BY
Burgess, Dinklage & Sprung
ATTORNEYS.

INVENTOR
KONRAD GREBE
BY
Burgess, Dinklage & Sprung
ATTORNEYS.

United States Patent Office 3,338,380
Patented Aug. 29, 1967

3,338,380
CONVEYOR BAND WITH CARRIERS
Konrad Grebe, Auf dem Nutzenberg 1, Wuppertal-Elberfeld, Germany
Filed Sept. 10, 1965, Ser. No. 486,566
Claims priority, application Germany, Sept. 10, 1964, G 41,480; May 22, 1965, G 43,676
9 Claims. (Cl. 198—189)

ABSTRACT OF THE DISCLOSURE

A curve-negotiating conveyor band constructed with carrying members articulately connected to one another to form a continuous train, each carrying member having tooth parts projecting from both lateral sides, these tooth parts being shaped for engagement with a positive displacement type conveyor drive means and to pass between the flanges of pulleys serving to guide the motion of the carrying members.

---

The invention relates to a conveyor band of coupled units with carrying members which form an endless train, said band having practically continuous guide receiving means on both sides comprising a ridge-like portion engaging corresponding recesses of opposed paired pulleys in successive pulley stations. Conveyor belts of this kind are already known, in which the carrying members have accompanying wheels which roll on guiding rails. Additional guide receiving means are fastened to the band, those means consisting of a chain of round members surrounded by a jacketing, and are used only for this purpose of providing a better guidance of the conveyor belt on curves and of relieving the associated guide rails of the pressure which they otherwise would have to withstand when the conveyor belt passes through a curve. The stationary pulleys are therefore disposed along this guide track on the inside of curves and only on curves. Opposed pulleys on the outside of the curve can also be substituted by a stationary rail.

Figure 5:
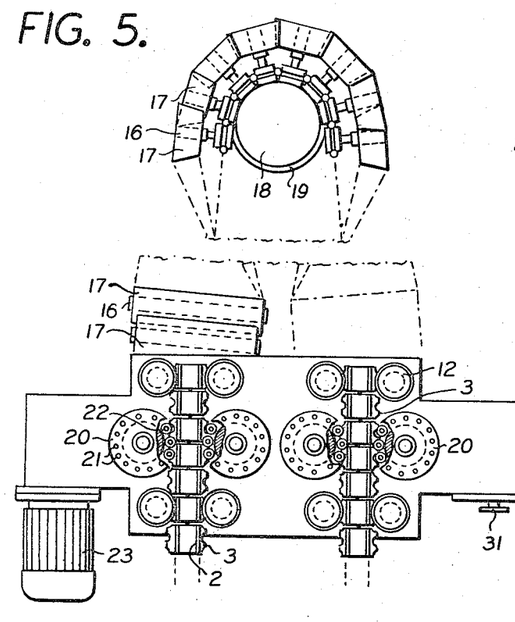
FIG. 5 is a top view, partially in section and with part of the conveying surface omitted, of a horizontal turn-around and the means for driving the band, which engages both the arriving and the departing sections of the latter.
Figure 9:
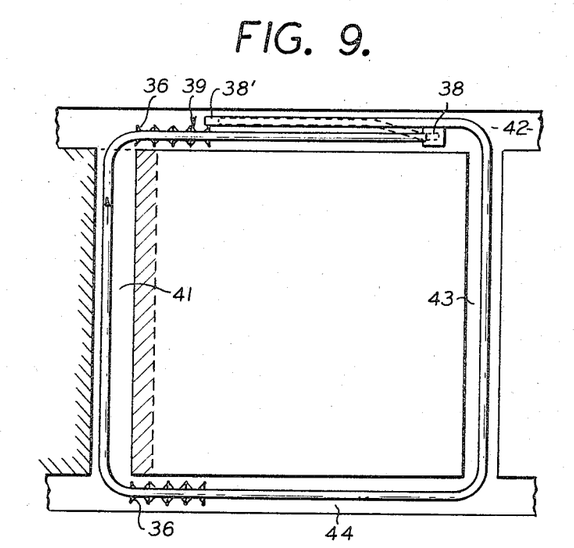
FIGS. 9 and 10 show the drawing out of a loop-flight in a one-way conveyor installation.
Figure 10:
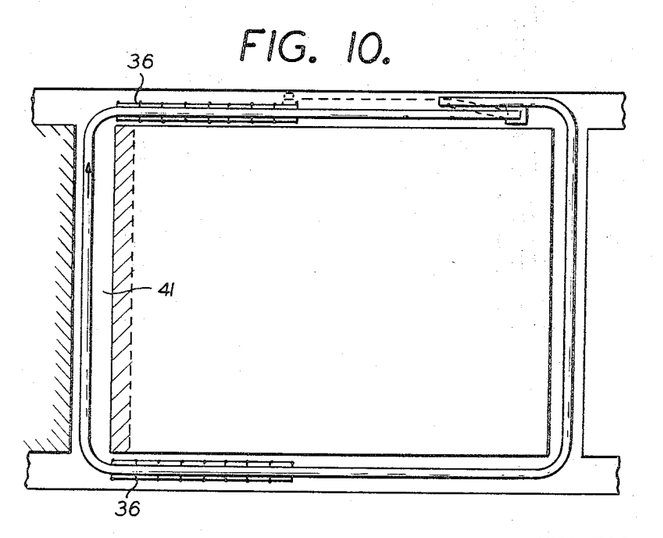

The stationary pulley pairs may serve not only in the curve for the guidance of the conveyor band, but may simultaneously bear the ridge-like guide receiving means of the conveyor band which has no accompanying wheels and is carried and guided only by the stationary pairs of the pulleys. The train members, to which the conveyor plates are fastened, are held between the pulleys of a pair by spacing and shaping of the pulleys with such slight free play towards the guide receiving means that the conveyor plates, which overlap like fishscales, are secured together against tipping by those plates which, in turn, are each supported through the associated train member in a tip-proof manner between the pulleys of a pair. It is true that this system offers many advantages for the guidance of a conveyor belt that passes around curves, but they are offset by a great number of disadvantages. The first disadvantage is the great number of stationary pairs of pulleys which are needed due to the close spacing of the pairs in order to secure a conveyor band of this kind against tipping. Another disadvantage lies in the fact that the tipping stresses which occur when the conveyor loading is one-sided—and such one-sided loading can never be prevented reliably—have to be withstood by the support of the conveyor plates on one another. This necessitates a very accurate formation of the overlapping parts of these plates and a great stability on their part, but on the other hand, it makes it impossible to deliberately tip the material being conveyed to one side. The possibility of tipping, however, is especially important in the case of single-loop conveyor systems (as shown in FIGURES 5, 9 and 10), because in conveyor systems which have no turnover drums, a lateral tipping-off of the materials by twisting the carrying surface is the simplest and most advantageous form of discharge.

It is therefore an object of this invention to overcome these and other difficulties encountered in the prior art. Additionally, it is an object of the present invention to provide a conveyor band with carrying members associated with means to substantially prevent such band from vertically sagging and the carrying members from horizontally tilting. It is another object of this invention to provide a conveyor band comprising linked carrying members with guide-receiving means and independent guide means spaced at substantially large intervals. It is another object of this invention to provide driving means associated with such guide receiving means of the carrying members. It is another object of this invention to link such carrying members with links that allow universal movements between connected members except in a load-bearing downward direction. It is another object of this invention to provide a curve-negotiating guide receiving means for the guide means of such conveyor band. It is another object of this invention to provide a conveyor system that is extensibly associated with shear members bearing guide means for the guide receiving means of such conveyor band.

These and other objects have been achieved by the present invention, which provides that the carrying members, combined into a chain of links by universally movable articulations form a continuous guide receiving means comprising lateral guiding projections, the chain being stiffened by supporting surfaces disposed on the chain or train units and limiting both their mutual deflection and tipping movements as well as the slack of the chain or train, and whose lateral guiding projections have a plane of symmetry which is disposed in the plane of the axes of the chain articulations. By the use of a link chain which is stiffened against slack in a known manner, it becomes possible to increase considerably the spacing between support members comprising pairs of guiding stationary pulleys, and thereby to save costs. The supporting surfaces which stiffen the link chain against slacking, have, in the case of a tippable band, the additional novel function of preventing any unintentional lateral tipping of the chain members and of the elements of the conveyor surface borne by them. The conveying surface can likewise be formed by overlapping troughs of a band of steel members, it being of course unnecessary to place special value on the accuracy of their overlap or on the stability of the trough plates. The trough members forming the conveying surface in the conveyor band of the invention, however, can also be made of an elastic material, in order in this manner to achieve the desired twisting of the conveying surface.

The more heavily loaded the conveying surface, the greater is the bearing pressure on the meeting surfaces which limit the droop of the train units between the pulley stations, and the better the stiffening of the train against droop, additionally such heavy loading will also act against an undesired lateral tipping of the train units. Nevertheless, it is possible, by means of additional stationary pulleys, for example, to lift the train units laterally, against the pressure weighing upon them, if they are coupled together by ball joints, for example, and thus to twist the train units along with the conveying surface mounted on them. In this manner, therefore, the disadvantage of the prior-art system which could not be laterally tipped for purposes of unloading is eliminated, along with the other prior-art disadvantages.

In addition to the spacial mobility of the conveyor train, which is created by the universally movable joints, whereby, on account of its stiffening, it can move only slightly upward, but can be curved considerably downward and to either side, and can also be twisted, the invention especially aims to assure a secure guidance of the train between the flanges of the stationary pairs of pulleys. This guidance is imperiled if the ridge-like lateral guiding projections of the successive conveyor train units vertically get out of line with one another in such a manner that, when the units pass through the pulley stations, the lateral projections of the following train unit do not enter securely between the flanges of the pulleys, but perhaps collide with the flanges or even pass above or below these flanges. The further the lateral projections lie above or below the plane of the joints of the train, the further they can get out of line with one another vertically, and therefore, provision is made according to the invention so that the plane of symmetry of the lateral guiding projections is in the plane of the axes of the train joints.

Even when the lateral guiding projections of successive carrying members are not immediately adjacent one another, their guidance through the stationary pulleys can be assured with certainty by providing a slanting surface on the upper and lower sides of the lateral guiding projections, the angle of inclination of this surface being adjusted to the given depth of the engagement of the lateral guiding projection into the pulleys and the given radius of the pulleys. If, accordingly, the stationary pulleys have a wedge-shaped opening between their flanges, the upper flange of the pulleys, with the periphery of the wedge-shaped groove, lies always higher, and the lower flange of the pulleys lies always lower than the other guiding surfaces of the wedge-shaped groove. The farthest projecting portions of the lateral ridge-like projections of a train unit guided through the stationary pulleys are necessarily carried in the bottom of the wedge-shaped groove when there is full engagement between the pulley stations and the guiding projection. The farthest projecting portions of the ridge-like lateral guiding projections of the next train unit coming into the same pulley station which is vertically out of line with the preceding one if the chain is being twisted, also necessarily come into contact first with the periphery of the wedge-shaped groove, namely with those portions of the upper or lower surface of this groove which adjoin the upper or the lower flange of the pulley. As the train unit moves further, the lateral projections are carried into the bottom of the groove and the corresponding conveyor train unit is thus positively rotated into the same plane in which the preceding train unit had been. If the angle of inclination of the said slanting surface is correctly chosen, any escape of the conveyor train units from the guidance imparted to them by the stationary pair of pulleys is impossible. If the conveyor train has to be taken out of this guide, it is necessary either to separate it, or at least it is necessary to swing one of the pair of stationary pulleys laterally away from the direction of conveyance, out of its working position.

The escape of the conveyor train units is further opposed by the above-mentioned meeting surfaces which limit the deflection and twisting movements of the outside or female member of the connecting links (or of the outer parts of the offset links) of the one train unit in relation to the inside or male member links (or inside parts of the offset links) of the adjacent train unit. The accuracy of this limitation depends on the amount of free play in the universally movable joint by which the two-train units are coupled. If this train joint is a ball joint, it is important, in order to operate without unnecessary play in the articulated coupling, that all deflection and twisting movements of the train units in respect to one another take place between the ball and socket, where the least joint wear is to be expected on account of the low specific loading. Pivot pins passing through the ball joints are therefore provided with means to prevent turning in the outside links and against turning in the ball joints, in order to avoid any wear on these pins. The securing of such pivot pins against turning in the outside links or against turning in the ball joints is known in the art.

In order to facilitate the driving of the conveyor band of the invention, the guide receiving means formed by the train of links is, according to another feature of the invention, provided with teeth on both sides. In order to assure a uniform shape in the train units, the pitch of the teeth is a fraction of the division of the train of links, i.e., each unit of the train of links is to have 2 (3, 4, 5, ...) teeth on each side. This flexible rack of teeth arranged along the sides of the chain can thus bend to the right and left and downward from member to member and can be twisted. It can bend upward to the extent permitted by the means provided for stiffening against droop. Nevertheless, under the influence of the train tension, which is imparted by a tensioning device, placed at the turnovers, for example, tension supplied by the chains, and own weight and the weight of the material being carried, the chain is sufficiently rigid to permit the regular engagement of a toothed driving means enveloping it from one or both sides. It is also possible to provide a friction drive or a magnetic intermediate drive for the engagement of a guide receiving means that is not provided with teeth or any combination thereof with such teeth.

In the case of a flexible rack of teeth, the tooth indentations which are best provided on the lateral ridge-like projections of the links engaging the stationary pairs of pulleys on both sides, do not extend, according to another feature of the invention, over the full width of the projection, so that the teeth do not interrupt the lateral guiding surface of the guide receiving means which are disposed above and below the lateral projection, and a portion of the bearing surface of the guide receiving means which is formed by the lateral projection also is preserved in the recesses of the track.

This assures an undisturbed cooperation between the guide receiving means and the pulley stations in spite of the tooth indentations in the guide receiving means. The twistability of the conveyor train and its guidance by the pulley stations in the twist is further improved by the fact that the creation of the teeth removes the corners of the ridge-like projections on each conveyor train unit.

The carrying members of the conveyor band, or every second, third, etc. carrying member of the conveyor band can be associated, as in the prior art, with accompanying wheels which roll on rails preferably laid laterally of the stationary pairs of pulleys. In this case, the pulley stations serve mainly to guide the band in the curves, while the rails substantially assume the load of the band and of the material being conveyed, and facilitate the twisting over of the conveyor band. However, these rails and the accompanying wheels can be omitted, so that the stationary pulley pairs support the band. This latter system is especially advantageous wherever great portability of the supporting framework and the possibility of quick lengthening and shortening of the conveyor system are desired.

As a turnover for the band, it is expedient to use a drum on whose circumference lie the links of the carrying members of the conveyor band which have an arcuate recess matching the said circumference. This turnover drum has on its circumference annular wedge-shaped elevated portions for the guidance of the carrying members on both sides of the outside links of the conveyor band, or the ridge-like lateral projections of same. In the case of over-and-under conveyor systems, this turnover drum has a horizontal axis. Conveyor systems with two sections carrying on parallel flights are directed, in a prior-art manner, around a turn-around having a drum with a vertical axis, the turnover drum of the band according to the invention being connected with a framework section whose carrying pulley stations are arranged to cause the carrying surface to twist over from the carrying position into the turn-around and, when leaving the turn-around, to twist back into the carrying position.

A conveyor band which is movable in every direction and is not bound to a rigid rail guide, like the conveyor band of the invention, is usable wherever a conveyor has to be moved longitudinally, displaced laterally, pulled out or continuously lengthened and shortened. It is true that the distance between the pulley stations which carry and guide the conveyor band is limited to a certain maximum if the ability of the conveyor band to function is not to be disturbed. It makes no difference in principle whether a ten-meter-long section of the conveyor band is carried and guided by 5 or by 50 pulley stations arranged in tandem. Thus, if the spacing between pulley stations is adjustable, then a section of supporting frame which consists of a certain number of pulley stations in close succession can easily be drawn out to a multiple of its length, and then be drawn back again to a fraction of this length. According to an especially advantageous embodiment of the present invention, pulley stands are combined together by means of shear-like members; in the extended state, these coupling members hold the supporting stands at their normal spacing from one another, and in the compressed or folded state, they still assure a minimum spacing between the supporting stands; at the same time, they prevent the pulley stands from becoming offset from one another or tilting with respect to one another in an undesirable manner when they are being displaced. Nevertheless, by opening the right and left shears to different widths, they make it possible to draw the supporting framework into a curve. The shear members can, if desired, be made so as to lock in the desired final position by means known in the art. In the case of rubber belts, which can be laid only in a rectilinear arrangement, such shear members between successive supporting frames are in the prior art, but they are novel in connection with a spatially movable multiple-unit conveyor.

The above-described features of the conveyor of the invention permit the use of methods of longitudinal movement, of extension, and of lengthening and shortening the conveyor, which are entirely new in connection with a spatially movable multiple-unit conveyor, but partially also in connection with conveyors of any kind. Thus, it is now possible to displace a conveyor longitudinally by a considerable amount without the necessity of pulling the entire supporting framework of the conveyor along with it.

According to a proposal which is in the prior art, provision has been made, in the case of conveyors running on rails, for installing telescopic sections at both ends of a conveyor band, which can be simultaneously drawn out at one end and pushed in at the other. Such telescoping sections, however, are expensive; they are very limited in variability of length, and they are troublesome when changing the direction of advance. The conveyor of the invention does not require such telescoping sections, since it does not need rail guides for its moving members. Even if its carrying members should have accompanying wheels for the purpose of relieving the load on the pulley stations in certain parts of the length of the conveyor, or of reducing the number of pulley stations, it is nevertheless possible in the extensible end areas of the conveyor framework to do without any rail guidance for these accompanying wheels, and to let the conveyor be carried and guided by the pulley stations alone. A great freedom of longitudinal displacement is of great importance to many different conveyor applications in mining, such as the driving of drifts, the driving of galleries, for the building up and removal of dumps, for bringing in fill head-on, etc.

If a conveyor whose supporting frames, equipped with two pulley stations adjacent one another or side-by-side, are coupled with one another by shear members, is to be displaced longitudinally, these supporting frames are coupled together at the advancing end by closed shear members which open one after the other, and at the other end by open shear members which close one after the other. The drive or drives are located either in the part of the framework that remains stationary, or they are connected to the leading or following turnover. The leading turnover is pulled forward by, for example, a drift driving machine, by a winch, or by hydraulic advancing cylinders bearing against steady points outside of the conveyors, these cylinders being capable of releasing themselves in their action, if desired. These cylinders pull the rear turnover after it by means of the conveyor band, whose length remains unchanged during the conveying operation. In order to keep the conveyor band uniformly tensed, it may be expedience to connect the rear turnover to an elastically yielding tensing means, such as a cable that is laid out by a compressed-air winch as the turnover advances. If the system is lengthened by the amount by which it had advanced, this winch simultaneously serves to pull the rear turnover back into its original position, along with the conveyor band, which is opened up at the other end of the system, and with the pulley station stands connected to it by shear members, after which the system is lengthened by correspondingly lengthening the band and by installing new supporting frames. The reverse process is effected after a longitudinal displacement corresponding to the migration of the loading point or unloading point during a conveying operation, so that a system of this kind can also be shortened during the periods when no material is being conveyed, and in either case, the other end of the conveyor system will move by the said amount during the conveying operation, but is ready again at the original starting point at the commencement of the next operation, for a movement of the same size.

For example, in the case of the driving of a mine drift, to avoid having to have the point of the unloading of the conveyed material that has been won out move forward with the advancement of the point at which it is loaded onto the conveyor, it is possible with conveyors of two parallel flights to make an arrangements, whereby the outcoming flight is carried through a stationary curve into an over-and-under section with a stationary dumping trip.

There is also connected to the ingoing flight of this type of installation via a stationary curve, an over-and-under section terminating in a turnover with a horizontal drum axis, but this turnover is not stationary, but is pulled along by the conveyor band as the latter is pulled forward by the turn-around connected to the drift driving machine, and it advances by the same amount that the turn-around advances during the conveying operation, thus causing the over-and-under section of the system, whose lower stretch connects the two turnovers together, as described above, to be shortened accordingly.

This system is a close approach to the drawing out of a loop-flight conveyor as in the prior art, wherein rubber belts are used. But even in the case of over-and-under type overlapping platform conveyors of the kind according to the invention, an elongation of the conveyor is possible during the operation of the conveyor, along with a simultaneous shortening of one loop of the conveyor. In that case, an over-and-under supporting framework section is laid preferably parallel to a single loop-like framework section, one flight of which is used as a dumping station as described previously herein. The dumping station terminates at a stationary turnover, after which the band passes through the bottom of the over-and-under framework and turns around a second turnover, which is connected to a yielding tensioning means. The band then passes through the top of the over-and-under framework and continues from that point as part of the single-loop portion again. The yieldably mounted turnover disposed on the end of the conveyor band can be fed into the single-loop and advances by the above-described method, while the over-and-under loop also shortens accordingly, by the method described above.

A loop-flight conveyor that runs in a circle can also have, beside or below the carrying section, a loop that is carried back into the carrying section, so that a stationary dump trip is provided, and the pulling forces on the displaceable turnover of the loop, by which the loop is shortened, are produced by the fact that the circle in which the supporting framework of the system is laid out is expanded by the action of hydraulic advancing cylinders or the like. That is, the spacing between the supporting frames of the systems is at least locally expanded.

When no material is being conveyed, the loop is drawn out again and the band is lengthened accordingly. At the same time, additional supporting frames are installed in the section of the circle that is to be expanded, so that the band can be drawn out again by a corresponding amount in the next period of operation.

The conveyor band is driven preferably by drives whose driving wheels engage from both sides into the rack which is formed in the guide receiving means for guiding track of the carrying members. This bilateral engagement assures good cooperation between the driving wheels and the rack. According to an additional feature of the invention, the flanges of these driving wheels, like the pulleys of the pulley stations, envelop the guide receiving means for the guiding track of the carrying members from above and below. At the same time, the two flanges of each driving wheel are fastened to one another by pins which engage into the teeth of the rack, while rollers mounted on these pins roll against the teeth of the rack.

The driving wheels engaging the one run of the toothed conveyor train can be connected by a disengageable clutch to the driving wheels rotating in the opposite direction and engaging the return run of the conveyor chain. When the clutch is engaged the movements of both runs are synchronized by the drive acting upon them. When the clutch is disengaged, it is possible to move only the one run of the conveyor train, while the other run does not have to move simultaneously. This permits the drawing out, longitudinal displacement and lengthening of a system whose drives are stationary and have their driving wheels in engagement with both runs of the conveyor train.

If stationary drives are used in these cases, which each engage in only one run of the conveyor chain, their motors must be independent of one another in rotatory speed, so that the system can be displaced, drawn out and lengthened longitudinally according to the above-described process.

However, the conveyor of the invention can also be constructed and used as a portable conveyor in an especially advantageous manner.

Since the conveyor of the invention is a linked-unit conveyor that can pass around curves, and one that can easily be lengthened and shortened and requires no rail guidance since it needs only a series of successive pulley stations to guide it, which by their position in relation to one another directly determine the path on which the band members move, this conveyor is especially suited for construction as a portable over-and-under conveyor which can be pulled through any desired curves and which furthermore can be easily lengthened and shortened as desired. Each crosspiece of the conveyor framework, or every second or every third etc. crosspiece is then equipped with wheels, and the crosspieces which are each provided with one pulley station for the guidance of the upper run and a pulley station for the guidance of the lower run of the band are joined together by longitudinal bars which are fastened to them and can be coupled by means of a vertical bolt to the following or preceding crosspiece.

The arrangement of wheels on crosspieces of the conveyor framework is just as much a part of the prior art as the articulated combination of car-like elements into a traveling conveyor frame. A traveling frame which can negotiate curves and can be used for a linked-unit conveyor running over its entire length without a continuous guide for the conveyor units is, however, new, and offers important advantages. The arrangement of the articulations on the crosspiece, that is, in the vertical plane of the pulley stations, assures that, even when the conveyor runs through curves, the conveyor band forming a chord between the pulley stations will keep its length unchanged in relation to the length of the conveyor framework. The band does not have to be additionally tensed in the curve, and on the other hand, the articulation points of the conveyor frame are prevented from collapsing under the influence of the band tension. An additional contribution to this is the fact that, according to another feature of the invention, the interconnected framework units are permitted to perform a mutual vertical deflection only by the clearance in the joints and/or by elastic deformation of the longitudinal members. Thus, the portable frame can be run over synclines and anticlines, but it is nevertheless protected against buckling.

It is possible to make use of the restricted freedom of deflection of the guide receiving means for guiding track formed by the units of the conveyor band for the purpose of controlling the freedom of deflection of the units of the mobile conveyor framework in the horizontal plane. The invention, however, provides for relieving the guide receiving means for guiding track formed by the conveyor band units of such stresses by the fact that, even if the conveyor band were not installed in the mobile framework, the mutual horizontal freedom of deflection of the interconnected framework units is restricted to the same extent as the mutual freedom of deflection of the conveyor band units forming the guide receiving means for guiding track. Although, the articulately interconnected framework units normally have a greater separation between them than the conveyor band carrying members, so that, for example, two, three, or four band carrying members might be able theoretically to pivot 2° against one another, where a framework unit in an arrangement having twice, three times or four times the spacing of the carrying members can pivot 4°, 6° or 8° against the adjacent framework unit, it is nevertheless practically desirable for every pulley station to determine the direction of the actually rectilinear section of the band that is pulled through it, so that this section is deflected only at one point, that is, only by the amount of a deflection between two adjacent carrying members in relation to the section whose direction is determined by the adjacent pulley station.

In conveyors, whose framework is equipped with wheels on every crosspiece, this can be accomplished by having the length of the longitudinal members in such a ratio to the diameter of the wheels that, at the specified deflection of the successive framework units, the wheels associated with them meet one another on the inside curve. If the wheels are carried by rails, the radius of curvature to which the tracks are bent can also determine the limits of this freedom of deflection.

If only every second or third crosspiece of the mobile frame is equipped with wheels, the horizontal freedom of deflection of the framework parts in relation to one another, is best limited by stops acting on the longitudinal members, which are placed within range of their articulated couplings.

Examples of the embodiment of the invention are represented in the annexed drawings.

FIGS. 11 to 13 show the construction of the conveyor as a portable conveyor, FIG. 11 showing it in cross section.

Figure 1:
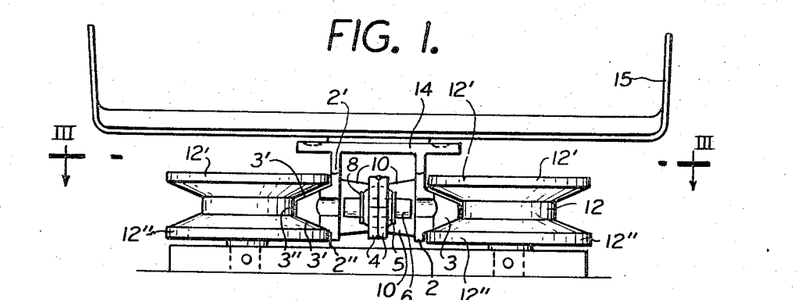
FIG. 1 is an elevation of the band on line I—I of FIG. 3, with a conveying surface formed of trough-shaped plates.
Figures 1A, 1B, 1C:
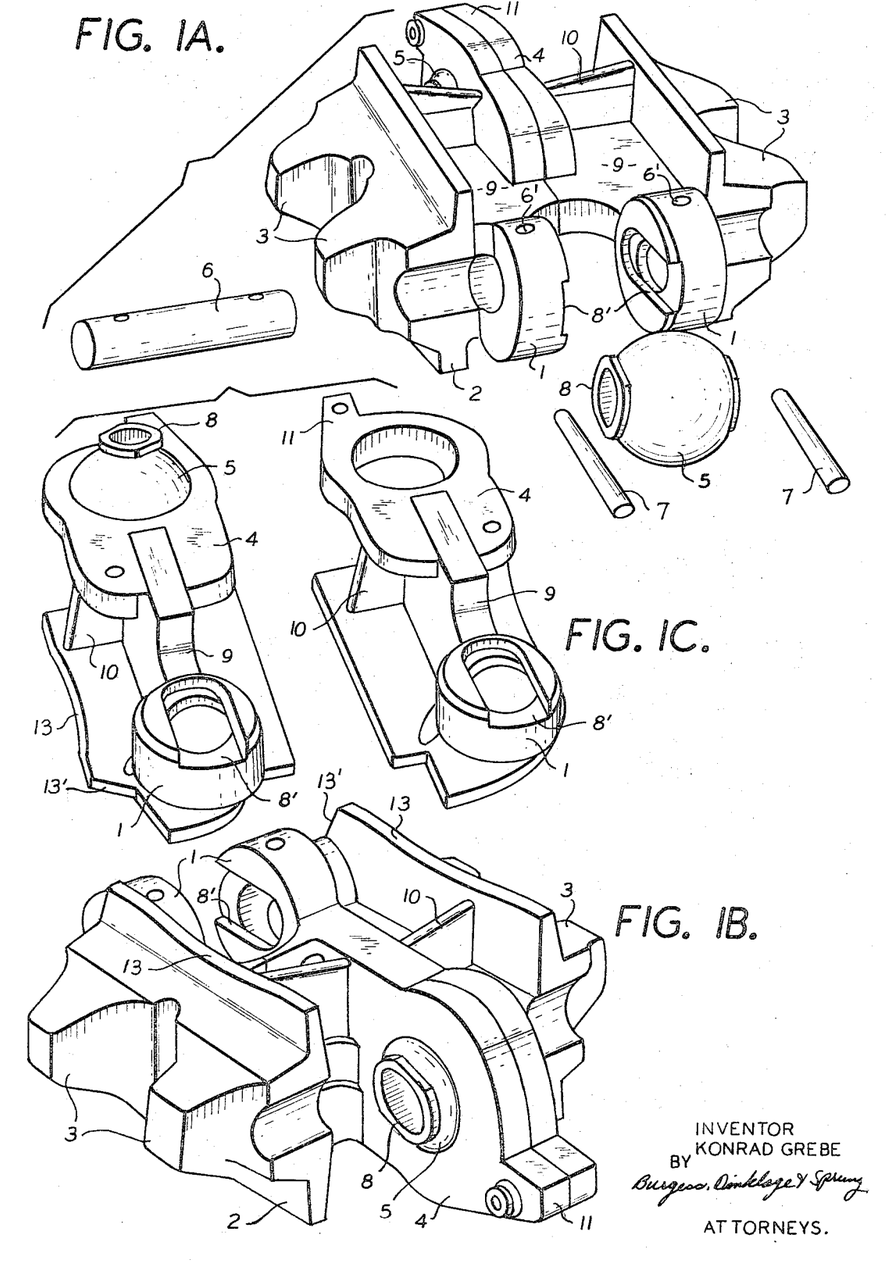
Figure 2:
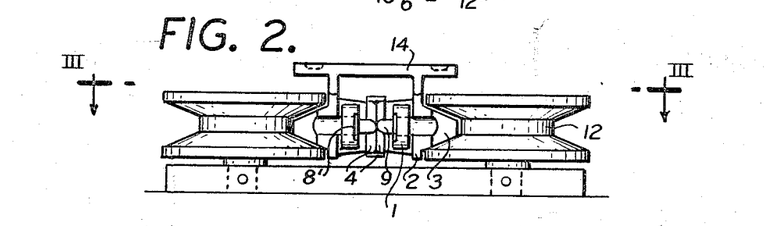
FIG. 2 is an elevation of the band on line II—II of FIG. 3, with the conveying surface omitted.
Figures 3, 4:
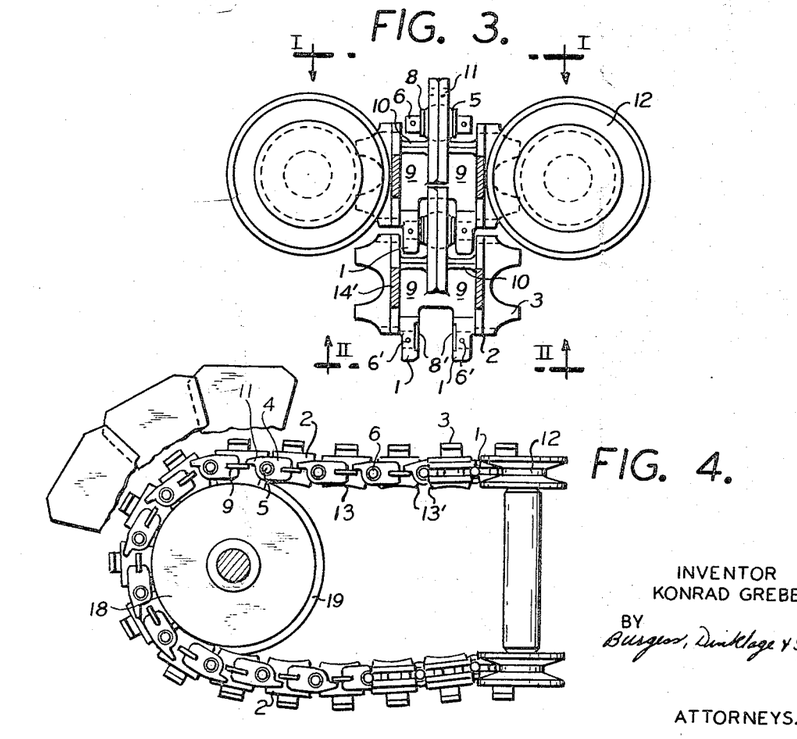
FIG. 3 is a top view of the carrying members of the band.
FIG. 4 is a side view of the turn-around of a continuous band installation, partially in section, and with some of the conveying surface formed of trough-shaped plates being omitted.
Figures 7, 8:
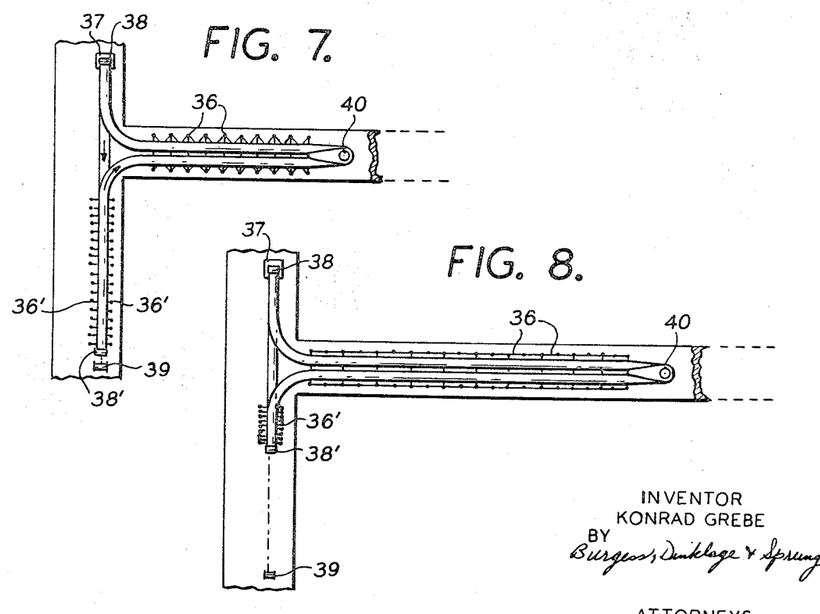
FIGS. 7 and 8 show the installation of a band system in a mine drift, and its position at the beginning and at the end of the conveying action.
Figure 11:
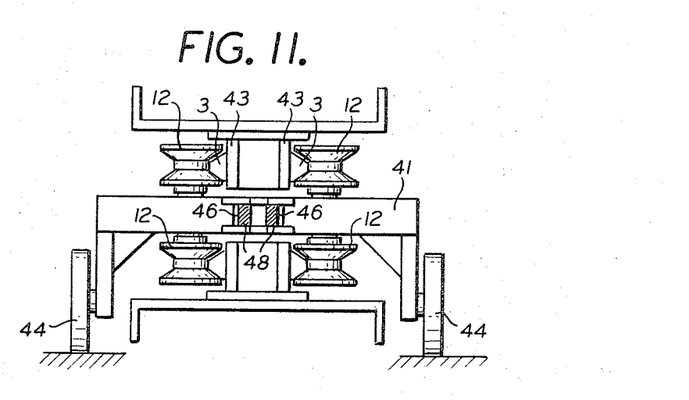
Figure 12:
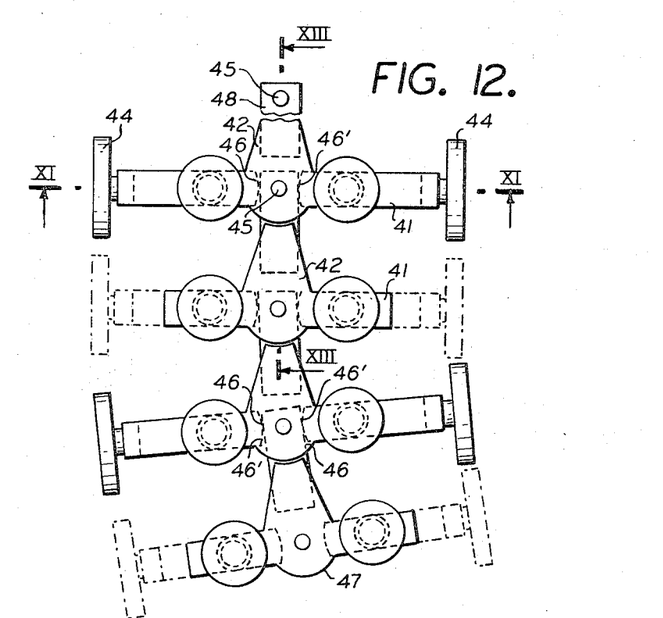
FIG. 12 is a plan view of a section of the conveyor frame with the band omitted.

The continuous belt or band conveyor which simply runs over a pair of horizontal pulleys disposed one at each end are referred to as an "over-and-under" conveyor as illustrated in FIGS. 4, 11, 12; the upper portion is referred to as the carrying run and the lower portion as the return run. The band conveyor of the type illustrated in FIGS. 9 and 10 is referred to as a "loop-flight" conveyor. The conveyor illustrated in FIGS. 7 and 8 is referred to as one having parallel carrying runs or flights. The conveyor terminus consisting of a horizontal drum over which an over-and-under conveyor belt is reversed in its direction of movement is referred to as a "turnover." A "turn-around" is a similmar drum which is vertically disposed, and onto which the horizontally disposed belt is fed with a quarter turn into a vertical plane.

The outside portions 1 of the offset links of the band carrying members have a guide receiving means for guiding track 2 which is equipped with a toothed projecting portion 3. The inside parts 4 of the links of the band carrying members are welded together, for example, and are each provided with half of a ball socket for receiving ball 5 of a ball joint. Ball 5 has a pin 6 running through it, pin 6 also having a pair of pin-receiving means at its outer extremities and is held in the outside parts of the links by retaining pins 7, engaging said pair of pin-receiving means. The pivoting of ball 5 in relation to pin 6 is prevented by holding the ball fast in relation to the outside links by providing it with a projecting portion 8, which is designed as an anti-pivoting means and which is carried in and engages a parallel guiding groove 8' in the outer portions 1 of the links. When the system is assembled, the inside parts of the links of each succeeding band supporting member are inserted with the balls pivotally mounted in them into this guiding groove 8' of the outer portions 1 of the last band supporting member; pin 6 is pushed through the hole in ball 5 and the pin-receiving means in outside parts 1 of the links and through the openings in the associated sections of the guide receiving means for guiding track, and is held in place by the retaining pins 7.

Between the outsile portions 1 and the inside portions 4, there is a recess in the links, running as far as crosspiece 9. The inside portions 4 are connected with the guide receiving means for guiding track 2 by reinforcing ribs 10. The crosspiece 9 at the same time forms the supporting surface on which a projection 11 of the inside portions 4 of the links rests, and as a result of this support, the chain formed by the band supporting members can have only a very slight sag. The angular movements between two successive band supporting members in the turn-around are limited by the meeting surfaces 13' of the guide receiving means for guide tracks 2, and the mutual angular movements on curves and in the horizontal turn-around by the clearance between the inside parts 4 of the links and outside parts 1 at the articulation. Any unintentional lateral tipping of the band supporting members is opposed in the conveyor flight by the fact that projections 11 rest upon the crosspieces 9. In the return section, such tipping is unimportant, since the band supporting members will be returned automatically to their horizontal position at the next pulley station.

For this purpose, the projecting portion 3 has on its upper side and its lower side a slanting surface 3' matched by a slant in the groove in the pulleys 12 which are combined in pairs to form the pulley stations which carry and guide the band. Though the teeth in the projecting portion 3 do not extend over this entire width, the remaining portions of the slanting surfaces 3' nevertheless still engage into the groove of pulley 12 so that they would give the assurance that the band supporting members are guided and carried by the pulleys 12. In addition, vertical surfaces 2' and 2" of the guide receiving means for guiding track can be guided on the flanges 12' and 12" of the pulleys 12. The farthest projecting portions 3" of the projecting portion 3, which run in the bottom of the groove of the pulley, lie with their edges below flanges 12' and above flanges 12" by an amount which is determined by the width of the projecting portion 3 and the angle of the slanting surfaces 3'.

If, as in the prior art, the successive band supporting members should run through guiding rails arranged parallel to them, each succeeding band supporting member would have to lie in precisely the same plane as the preceding band supporting member. Since, however, according to the present invention, the following band supporting member has a vertical clearance in relation to the flanges of these pulleys, the band supporting members apply themselves tangentially to the pulleys at the pulley stations. It has also been observed that the smaller the radius of the pulleys, the greater the angle of the slanting surfaces of the projecting portion and of the groove, and the greater the distance between the band supporting members, the greater this clearance is. The entry of the band supporting members into the pulley stations is thus the same as their entry into the flaring expansion of a guiding rail. The further the band supporting member runs into the pulley station, the smaller becomes the clearance between its projecting portions and the flanges of the pulleys. That is to say, all band supporting members must be in the same plane while they are running through the pulley station. But when they run into the pulley station, they may be tilted, and when they run out of it, they may become tilted out of this plane as far as the clearance between their projecting portions and the flanges of the pulleys may at any time permit.

If the mutual angling of pivoting freedom of two successive band supporting members in relation to one another is limited by the above-mentioned meeting surfaces in such a manner that it always remains within the bounds of the clearance which the band supporting members have between their projecting portions and the pulley flanges as they enter and depart from the pulley stations, no escape of the band from the guides in the pulley stations is possible. On the other hand, this clearance makes possible the planned turning of the band carried through the pulley stations, as shown for example in FIG. 5.

The outside portions 1 of the links, and the guide receiving means for guiding track 3 associated therewith, are provided on their underside with an arcuate recess 13, and on their upper side they are provided with a platform 14 for the mounting of trough-shaped plates 15.

The end drums 18, which may have a horizontal axis (FIG. 4) or a vertical axis (FIG. 5), are provided on both sides of the band-carrying members of the chain with one wedge-shaped annular rib 19 each, by which the conveyor chain is prevented from migrating toward the ends of the drums. The pulley stations disposed between the turn-around and the drive, which support the circulation of the band, are not represented in FIG. 5.

The driving wheels of the driving means engage on both sides of the teeth up to the guide receiving means for guiding track 2. At the same time, the flanges of the driving wheels 20, like the flanges of pulleys 12, grasp the projecting portion 3 from above and below. Between these flanges are mounted pins 21 on which the rollers 22 are rotatably mounted, which engage into the teeth projecting from the guide receiving means for guiding track. These rollers 22 roll, during the rotation of the driving wheels 20, on the teeth projecting from the guide receiving means for guiding track 2, which are advanced by the said rollers. According to the example of embodiment represented in FIG. 6, the motor 23 of the drive acts through the sprocket 24 and the chain drive 25 on a worm 26 which meshes with the worm gears 27. The driving wheels 20 are splined onto the shafts of these worm gears. By means of a disengageable clutch 28, the worm 26 acts through another chain 29 on a gear 30 which meshes with a gear 30'. From there the worm 26' is driven in like manner through the chain 29', which thus rotates in the opposite direction of worm 26. A single chain drive can also be used instead of parts 29, 30, 30' and 29', with a left-hand pitch. The parallel portion of the band in both cases is driven synchronously by worm gears 27' in the opposite direction.

The motor 23 can also be flange mounted at 31, so that, through the chain drive 25', the power can be transmitted in the reverse direction through worm 26' to worm 26. It the two halves of the band are disposed one over the other, the gears 30 and 30' can be disposed directly on the shaft of worms 26 and 26' which in that case are given the same pitch. Where synchronous operation of the two halves is not necessary or not desired, each half of the conveyor band can be associated with a drive with its own motor, thereby eliminating the transmission linkage 28 and 30.

In the contractible and extensible sections of the supporting framework, the successive stands (whether the band conveyors are loop-flight conveyors or over-and-under conveyors or conveyors with both halves carrying on parallel flights) are coupled together by shear-like members 36, which are either contracted as in FIGS. 7 and 9, or extended as in FIGS. 8 and 10. If it is desired to provide guidance for these stands in the direction in which they are shifted, they can be set up on tracks. Tracks for accompanying wheels would have to be of a telescoping type of construction. Tracks for pulley stations such as these, however, do not have to be able to be pulled out. If it should be necessary, they can be extended at the end by the addition of ordinary rails, or they can be shortened by the removal of rails. The possibilities for shifting a conveyor longitudinally or drawing it out are thus practically unlimited in the conveyor of the invention.

Examples of the method which is made possible by the application of the invention for the longitudinal displacement, extension, elongation and shortening of a conveyor are represented in FIGS. 7 to 10. FIGS. 7 and 8 show the use of the conveyor in the driving of drifts in mines. A horizontal turn-around 40 in FIG. 5 is connected to a gallery driving machine that is not shown. Behind the horizontal turn-around, the material to be conveyed is fed by a feeder conveyor, for example, onto the flight that carries the material to a bunker 37. There, the band is carried around a turnover 38, constructed according to FIG. 4, by which the material is dumped. In the underpass, the band then runs to another turnover 38', from whence it returns in the upper position, back to the turn-around 40. On its way back it can serve for the conveying of material which is automatically dumped by the turn-around or is discharged before reaching the point.

As the gallery driving machine advances, the turn-around 40 advances continuously or step-wise during the entire operation. At the same time, the shear-like connecting members 36 of the stands bearing the parallel runs of the conveyor, which had been drawn together at the beginning of the operation (FIG. 7), are successively brought into an extended position. Since the band covering does not change in length and the turnover 38 is stationary, the turnover 38', which is suspended from the winch 39, is pulled along as the turn-around 40 advances, against the resistance of the winch 39, and drawing out the cable of the latter, while the shear members 36' are collapsed together. At the end of the operation, the position shown in FIG. 8 is reached. Then the shear-like connecting members are again collapsed in the direction of the turn-around 40, and new stationary stands are installed behind them, and the band is extended far enough to permit the turnover 38 to be pulled by winch 39 back into its original position. At the same time, the shear members 36' in the over-and-under section are restored to their outstretched position.

Figure 6:
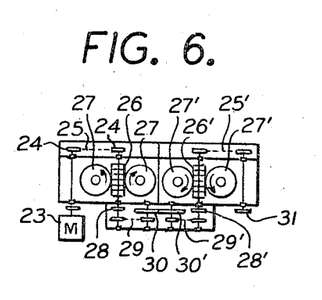
FIG. 6 is a schematic representation of the transmission associated with the driving means of FIG. 5.

The drive represented in FIGS. 5 and 6 can be connected to the horizontal turn-around and can be advanced together with it. The movement of the two parts of the conveyor is then kept synchronous by the drive. If a stationary drive were inserted into the main flight at the transition to the flight that advances, it would be necessary for the portion of the conveyor that is running to the dumping pulley 38 to run more slowly, and for the portion running to the turn-around 40 to run faster, according to the rate at which turn-around 40 advances into the gallery. This can be achieved by either associating a variable-speed motor and drive with each flight of the conveyor, or, where they are driven by a common motor, disengaging the clutch between the driving wheels acting upon the one flight and those acting on the other, during each advancement of the turn-around 40.

FIGS. 9 and 10 show the drawing out of a loop-flight conveyor, using the conveyor of the invention as a longwall conveyor. The band conveys material from the longwall 41 into the gallery 42, where a stationary turnover 38 is provided for dumping coal, for example, into a bunker. The lower return portion of the band is doubled at turnover 38 and at the band loop, when the band is brought to a movable turnover 38' suspended from a winch 39, on which it is restored to its original direction in the carrying position, and then returns through galleries 43 and 44 back into the longwall. At the entry and exit of the longwall gallery, supporting stands are erected in the adjoining galleries which, at the beginning of the operation, are connected to one another by collapsed shear-like members 36. Advancing means or cylinders push these stands apart by the same amount as the longwall advances with the progress of the mining. The shear-like members 36 are thereby extended. The band loop between the turnovers 38 and 38' shortens accordingly against the resistance of the winch 39. At the end of the operation, the band is opened, the band loop is drawn back out to its original length, the shear-like members 36 are collapsed in the direction of the longwall, and the gap thus produced in the band-carrying framework is filled by the insertion of additional stationary supporting frames, while the band is lengthened.

In like manner, a band loop can also be used for the expansion of an over-and-under type of band, in accordance with the invention. Numerous other applications are possible, wherein the band according to the invention can be used for the solution of conveying problems which hitherto have been unsolvable or solvable only with difficulty.

For example, in the bord-and-pillar mining system, fill can be brought steadily into the bord that is finished while the conveyor band installation is continually shortened, while beside it the new bord is being driven while the conveyor band installation is continually lengthened. In this case, it is best to serve both bords with the same conveyor system, which shortens in the one bord by the same amount that it lengthens in the other. The band itself remains unchanged in length until the first bord has been completely driven.

The system will then remain in the second bord so as to bring in fill; at the same time, it is lengthened in the gallery, by the installation of new supporting stands and new band units, to the third bord that is to be driven, whereupon the second and third bords are served in the same manner.

Figure 13:
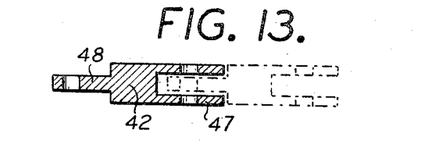
FIG. 13 is a longitudinal section through the articulated joint between cross supports and lengthwise supports of the frame.

In these and other such conveyor applications, however, a portable conveyor can be used, such as one drawn by a tractor or by a winch; the band supporting framework of such a conveyor would be designed as in FIGS. 11 to 13, and would be provided with wheels 44 running on the floor or on rails.

In those figures, the crosspieces of the conveyor framework are marked 41, the lengthwise pieces are marked 42; the pulleys fastened to the crosspieces and consituting the pulley stations are marked 12; the conveyor band supporting members carried between the pulleys and equipped with a guide receiving means for guiding track 3 are marked 43; the wheels on which the frame travels is marked 44; the vertical pins about which the framework parts pivot in relation to one another are marked 45; the meeting surfaces which limit the horizontal pivoting and to which the lengthwise pieces apply themselves at the maximum permissible horizontal deflection are designated as 46 and 46'.

The lengthwise pieces 42 have a forked rear end 47 which is rigidly affixed to the associated crosspiece and a front end 48 which projects tongue-like into the fork 47 of the preceding lengthwise piece, and which can pivot about the vertical pin 45 associated with the preceding crosspiece 41 as far as is permitted by the meeting surfaces 46 and 46' disposed on this crosspiece on both sides of the tongue. A vertical deflection of the lengthwise piece 42 with respect to the preceding lengthwise piece 41 is possible only to the extent permitted by the clearance present in the joint and/or by an elastic deformation of the lengthwise piece. At the same time, the arc in which the forked portion 47 of the lengthwise piece terminates serves for the support of the following lengthwise piece, which rests on the arcuate end of the upper limb of the fork when the conveyor runs over synclines, and on the extremity of the lower limb of the fork when the conveyor runs over anticlines.

If wheels are provided only on the second or third crosspiece, the crosspieces which are not provided with wheels may be of shorter length as indicated in FIG. 12. If every crosspiece is equipped with wheels, the stops 46 and 46' can be eliminated, since the horizontal deflection of the successive framework units can in this case be limited by the collision of the wheels with one another on the inside curve, as is also indicated in FIG. 12.

Although the invention has been described with reference to certain preferred embodiments, it is not intended that the invention be limited thereby, and certain modifications of the novel method and machine are intended to be included within the broad scope of the following claims.

What is claimed is:

1. A conveyor band which comprises a plurality of carrying members articulately connected to one another to form a continuous train disposed for movement along a path aligned with its length, a plurality of tooth members borne by each of said carrying members and projecting laterally therefrom for engagement with a drive means to advance said train of carrying members along said path, and stop means affixed to each of said carrying members to limit the relative articulation capability of adjacent carrying members in a given load-bearing direction and to stabilize adjacent carrying members against relative twisting movement and thereby allow said train of carrying members to traverse unsupported span lengths with a maximum deflection under load limited by said stop means.

2. The conveyor band according to claim 1 wherein the tooth members borne by each carrying member are disposed in a predetermined alignment relation with respect to said movement path to pass between spaced-apart guide flanges stationed at locations along said path and to engage said flanges to guide the motion of said carrying members along said path.

3. The conveyor band according to claim 2 wherein each carrying member has a first pair of tooth members affixed to one side and a second pair of tooth members affixed to the opposite side.

4. The conveyor band according to claim 3 wherein said stop means includes a member affixed to the upper portion of the carrying member and projecting from one end thereof, and an upper surface portion at the opposite end of the carrying member, the projecting member of each carrying member being disposed to engage the upper surface portion of an adjacent carrying member to limit the relative articulation capability in said load-bearing direction of each pair of adjacent carrying members.

5. The conveyor band according to claim 4 wherein the upper and lower surfaces of said tooth members are beveled to aid their entry and passage between similarly beveled guide flanges located on opposite sides of said movement path.

6. The conveyor band according to claim 4 wherein said carrying members are articulately connected to one another by ball joints axially mounted on said carrying members by means of a pin passing through said ball joint, said pin being secured against rotation in said carrying member by pin-securing means affixing said pin to said carrying member, said ball being secured against rotation with respect to said pin by ball-securing means.

7. The conveyor band according to claim 4 wherein said carrying members are provided with an arcuate recess matching the cylindrical surface of a turnover drum.

8. The conveyor band according to claim 4 including trough members of elastic material connected to said carrying members for support thereby and for movement therewith.

9. The conveyor band according to claim 4 wherein said carrying members are each constructed from a pair of opposite hand half-members secured together along a plane of symmetry.

References Cited

UNITED STATES PATENTS

| 2,580,222 | 12/1951 | Gartner et al. | 198—37 |
| 2,646,160 | 7/1953 | Michna | 198—189 |
| 2,743,003 | 4/1956 | Allen | 198—189 |

FOREIGN PATENTS

| 1,124,424 | 2/1962 | Germany. | |

EVON C. BLUNK, *Primary Examiner.*

A. C. HODGSON, *Assistant Examiner.*